(12) United States Patent
Wysocki et al.

(10) Patent No.: US 11,178,121 B2
(45) Date of Patent: Nov. 16, 2021

(54) SECURE SOFTWARE UPDATES

(71) Applicant: Apple Inc., Cupertino, CA (US)

(72) Inventors: Christopher R. Wysocki, Los Gatos, CA (US); Alan Ward, Thornton, CO (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 16/579,699

(22) Filed: Sep. 23, 2019

(65) Prior Publication Data

US 2020/0084188 A1 Mar. 12, 2020

Related U.S. Application Data

(63) Continuation of application No. 15/914,999, filed on Mar. 7, 2018, now Pat. No. 10,432,593, which is a continuation of application No. 15/298,168, filed on Oct. 19, 2016, now Pat. No. 9,948,617, which is a continuation of application No. 11/190,735, filed on Jul. 26, 2005, now Pat. No. 9,489,496.

(51) Int. Cl.
*H04L 29/06* (2006.01)
*H04L 29/08* (2006.01)
*G06F 21/10* (2013.01)

(52) U.S. Cl.
CPC .......... *H04L 63/0435* (2013.01); *G06F 21/10* (2013.01); *H04L 63/061* (2013.01); *H04L 67/34* (2013.01); *G06F 2221/0744* (2013.01); *G06F 2221/2107* (2013.01)

(58) Field of Classification Search
CPC ... H04L 63/0435; H04L 63/061; H04L 67/34; G06F 21/10; G06F 2221/0744; G06F 2221/2107
See application file for complete search history.

(56) References Cited

U.S. PATENT DOCUMENTS

| | | |
|---|---|---|
| 5,774,551 A | 6/1998 | Wu et al. |
| 5,956,408 A | 9/1999 | Weston |
| 5,965,408 A | 10/1999 | Short |

(Continued)

FOREIGN PATENT DOCUMENTS

| | | | | |
|---|---|---|---|---|
| EP | 0778512 A2 * | 6/1997 | ......... | H04L 63/0442 |
| EP | 778512 A2 | 6/1997 | | |

(Continued)

OTHER PUBLICATIONS

Hicks et al., "Dynamic software updating", ACM SIGPLAN Notices, vol. 36, Issue 5, pp. 13-23, May (Year: 2001).*

(Continued)

*Primary Examiner* — Morshed Mehedi
(74) *Attorney, Agent, or Firm* — Dickinson Wright RLLP

(57) ABSTRACT

Improved techniques to update software in electronic devices that are already in use are disclosed. In one embodiment, software can be updated in a secure and controlled manner using cryptography. The authenticity of the updated software as well as its appropriateness for the particular electronic device can be confirmed prior to update. The software can also be updated on a per module basis. In one embodiment, a server hosts software updates for various electronic devices, and supplies the appropriate software update to the electronic devices via a data network.

20 Claims, 11 Drawing Sheets

(56) References Cited

U.S. PATENT DOCUMENTS

| | | | |
|---|---|---|---|
| 5,974,454 A | 10/1999 | Apfel et al. | |
| 6,023,763 A | 2/2000 | Grumstrup et al. | |
| 6,195,432 B1 | 2/2001 | Takahashi et al. | |
| 6,314,566 B1 | 11/2001 | Arrouye et al. | |
| 6,434,695 B1 | 8/2002 | Esfahani et al. | |
| 6,615,355 B2 | 9/2003 | Mattison | |
| 6,628,314 B1 | 9/2003 | Hoyle | |
| 6,647,494 B1 | 11/2003 | Drews | |
| 6,789,255 B1 | 9/2004 | Pedrizetti et al. | |
| 6,976,053 B1 * | 12/2005 | Tripp | G06F 16/951 709/202 |
| 7,003,667 B1 | 2/2006 | Slick et al. | |
| 7,114,021 B2 | 9/2006 | Seshadri | |
| 7,386,877 B2 | 6/2008 | Winiger et al. | |
| 7,395,551 B2 | 7/2008 | Watanabe | |
| 7,707,405 B1 | 4/2010 | Gilman et al. | |
| 7,975,147 B1 | 7/2011 | Qumei | |
| 9,489,496 B2 | 11/2016 | Wysocki et al. | |
| 9,948,617 B2 | 4/2018 | Wysocki et al. | |
| 2002/0049679 A1 | 4/2002 | Russell et al. | |
| 2002/0053024 A1 | 5/2002 | Hashimoto et al. | |
| 2002/0112161 A1 | 8/2002 | Thomas, III et al. | |
| 2002/0188853 A1 * | 12/2002 | Owhadi | H04L 69/08 713/182 |
| 2003/0167409 A1 | 9/2003 | Sussman | |
| 2003/0188306 A1 | 10/2003 | David et al. | |
| 2003/0191955 A1 | 10/2003 | Wagner et al. | |
| 2004/0034724 A1 | 2/2004 | Bruner et al. | |
| 2004/0038675 A1 | 2/2004 | Criss et al. | |
| 2004/0068721 A1 | 4/2004 | O'Neill et al. | |
| 2004/0098715 A1 | 5/2004 | Aghera et al. | |
| 2004/0158817 A1 | 8/2004 | Okachi et al. | |
| 2004/0167859 A1 | 8/2004 | Mirabella | |
| 2004/0185931 A1 | 9/2004 | Lowell et al. | |
| 2004/0187011 A1 | 9/2004 | Lee et al. | |
| 2004/0193550 A1 | 9/2004 | Siegel | |
| 2004/0199766 A1 | 10/2004 | Chew et al. | |
| 2004/0215735 A1 | 10/2004 | Nakahara et al. | |
| 2004/0243994 A1 | 12/2004 | Nasu | |
| 2005/0004875 A1 | 1/2005 | Kontio et al. | |
| 2005/0044481 A1 * | 2/2005 | Collart | H04L 65/604 715/202 |
| 2005/0071839 A1 * | 3/2005 | Kim | G06F 8/65 717/170 |
| 2005/0099963 A1 * | 5/2005 | Multer | G06F 16/178 370/254 |
| 2005/0144437 A1 | 6/2005 | Ransom et al. | |
| 2005/0144465 A1 | 6/2005 | Senshu | |
| 2005/0204405 A1 | 9/2005 | Wormington et al. | |
| 2005/0256614 A1 | 11/2005 | Habermas | |
| 2005/0278787 A1 | 12/2005 | Naslund et al. | |
| 2006/0026304 A1 | 2/2006 | Price | |
| 2006/0107071 A1 | 5/2006 | Girish et al. | |
| 2006/0168578 A1 * | 7/2006 | Vorlicek | G06F 8/65 717/168 |
| 2006/0174240 A1 * | 8/2006 | Flynn | G06F 21/572 717/170 |
| 2007/0028109 A1 | 2/2007 | Wysocki et al. | |
| 2007/0028120 A1 | 2/2007 | Wysocki et al. | |
| 2007/0033419 A1 | 2/2007 | Kocher et al. | |
| 2008/0003991 A1 | 1/2008 | Sievers et al. | |
| 2017/0142079 A1 | 5/2017 | Wysocki et al. | |
| 2018/0302385 A1 | 10/2018 | Wysocki et al. | |

FOREIGN PATENT DOCUMENTS

| | | | |
|---|---|---|---|
| EP | 1091285 A2 | 4/2001 | |
| EP | 1128242 A2 | 8/2001 | |
| EP | 1256865 A2 | 11/2002 | |
| EP | 1460514 A2 | 9/2004 | |
| EP | 1659810 A1 | 5/2006 | |
| EP | 1570648 B1 * | 9/2015 | H04N 21/2351 |
| JP | 01117562 A | 5/1989 | |
| JP | 2000276335 A | 10/2000 | |
| JP | 2004514214 A | 5/2004 | |
| WO | 9807085 A1 | 2/1998 | |
| WO | 0241147 A1 | 5/2002 | |
| WO | 03088699 A1 | 10/2003 | |
| WO | 2004075092 A1 | 9/2004 | |
| WO | WO-2005053323 A2 * | 6/2005 | H04L 67/148 |

OTHER PUBLICATIONS

"Communication Relating to the Results of the Partial International Search" for International Application No. PCT/US2006/029355, International Filing Date Jul. 26, 2006.

International Search Report and Written Opinion for corresponding PCT Application No. PCT/US2006/0029355, dated Jun. 14, 2007.

Gkantsidis et al., ACM SIGCOMM Computer Communication Review, Oct. 2006, Proceedings of the 2006 conference on Applications, technologies, architectures, and protocols for computer communications, vol. 36, Issue 4, pp. 423-434.

Notification of the First Office Action for Chinese Application No. 200680032530.8, dated Jun. 5, 2009.

Notice of Preliminary Rejection for Korean Patent Application No. 10-2008-7004435, dated Jan. 20, 2010.

Notification of the First Office Action for Chinese Application No. 200680032530.8, dated Dec. 11, 2009.

Communication Pursuant to Article 94(3) EPC for EP Patent Application No. 06800440.7, dated Apr. 9, 2010.

Notification of the Third Office Action for Chinese Application No. 200680032530.8, dated May 31, 2010.

Examiner's First Report on Australian Patent Application No. 2006272577, dated Sep. 10, 2009.

Examiner's Report for Canadian Patent Application No. 2616358, dated Apr. 6, 2011.

Examiner's Second Report on Australian Patent Application No. 2006272577, dated Oct. 13, 2010.

Examiner's First Report on Australian Patent Application No. 2011202785, dated Jul. 19, 2011.

Office Action dated Aug. 21, 2012 issued in Japanese Application No. 2008-524181.

Canadian Patent Application No. 2616358—Office Action dated Sep. 17, 2013.

Canadian Patent Application No. 2616358—Office Action dated May 30, 2014.

Canadian Patent Application No. 2616358—Office Action dated Jul. 30, 2015.

European Office Action, Application No. 06800440.7, dated Feb. 14, 2013.

European Search Report, Application No. 12164845.5, dated Jul. 4, 2012.

European Application No. 06800440.7—Communication Pursuant Article 94(3) EPC dated Mar. 26, 2015.

Canadian Patent Application No. 2,616,358—Office Action dated Aug. 4, 2016.

Kon et al., "Using dynamic configuration to manage a scalable multimedia distribution system", Computer Communications, vol. 24, Issue 1, Jan. 1, 2001, pp. 105-123 (Year: 2001).

Lestideau et al., "Towards automated software component configuration and deployment", PDTSD '02. Orlando, www.odfs.semanticscholar.org (Year: 2002).

* cited by examiner

SECURE SOFTWARE UPDATES

CROSS-REFERENCE TO RELATED APPLICATIONS

This application is a continuation of U.S. application Ser. No. 15/914,999, filed Mar. 7, 2018, entitled "SECURE SOFTWARE UPDATES", set to issue U.S. Pat. No. 10,432,593 on Oct. 1, 2019, which is a continuation of U.S. application Ser. No. 15/298,168, filed Oct. 19, 2016, entitled "SECURE SOFTWARE UPDATES", now U.S. Pat. No. 9,948,617, issued Apr. 17, 2018, which is a continuation of U.S. application Ser. No. 11/190,735, filed Jul. 26, 2005, entitled "SECURE SOFTWARE UPDATES", now U.S. Pat. No. 9,489,496 issued Nov. 8, 2016, the contents of which are incorporated herein by reference in their entirety for all purposes.

This application is related to U.S. application Ser. No. 11/191,133, filed Jul. 26, 2005, entitled "CONFIGURATION OF A COMPUTING DEVICE IN A SECURE MANNER" now U.S. Pat. No. 7,809,949 issued Oct. 5, 2010, and U.S. patent application Ser. No. 10/988,054, filed Nov. 12, 2004, entitled "METHOD AND SYSTEM FOR UPDATING FIRMWARE STORED IN NON-VOLATILE MEMORY" now U.S. Pat. No. 7,730,326 issued Jun. 1, 2010, the contents of which are incorporated herein by reference in their entirety for all purposes.

FIELD

The invention relates to updating software and, more particularly, to updating software at a client using updated software acquired from a remote server.

BACKGROUND

It is common today for electronic devices to utilize software in their operation. Examples of electronic devices that utilize software include computers, personal digital assistants, media players and mobile telephones. However, at times, it is desirable to change or update the software being utilized by such electronic devices.

In the case of computers, updated software, such as a newer version, can be acquired from a remote server through a downloading process. Once acquired, the software can be installed on the computer. The installation process of the software can be controlled by requiring the user to enter an alphanumeric key or a registration code. Without the proper key or registration code, the updated software is unable to be installed. Still further, conventional approaches for updating software on computers requires substantial user participation. The need for user assistance is problematic given that users are concerned about downloading and installing software on computers given the propensity of computer viruses that exist today.

In the case of portable electronic devices (e.g., personal digital assistants, media assistants, mobile telephones) that utilize software, the software is typically initially installed during the manufacturing process. As a result, when the user receives the portable electronic device, the software is preinstalled and the portable electronic device is fully functional. However, when the software needs to be subsequently updated or modified, in many cases, the software installed on the portable electronic device cannot be altered by the end user. More recently, some portable electronic devices permit the software to be updated. For example, a portable electronic device could be connected to a computer that could completely replace the existing software on the portable electronic device with updated software. One complication that results is that portable electronic devices often support multiple functionalities. These different functionalities can be controlled by different software modules which can be provided by different vendors. Hence, it is often not appropriate to completely replace all of the software on a portable electronic device. Consequently, there is a need to support software update techniques that enable different software modules to be updated without disturbing other modules.

Accordingly, there is a need for automated, secure solutions for updating software on electronic devices.

SUMMARY

The invention pertains to improved techniques to update software in electronic devices that are already in use. In one embodiment, software can be updated in a secure and controlled manner using cryptography. The authenticity of the updated software as well as its appropriateness for the particular electronic device can be confirmed prior to update. The software can also be updated on a per module basis. In one embodiment, a server hosts software updates for various electronic devices, and supplies the appropriate software update to the electronic devices via a data network.

Although the invention is generally applicable to updating software of a wide variety of types, the invention is particularly well suited for updating digital rights management software. For security reasons, there can be a need to update DRM software in electronic devices that are in use. The improved techniques of the invention enable DRM software to be updated in a secure and controlled manner. In one implementation, the updating of the DRM software operates to modify a DRM software library provided at the electronic devices.

The invention is suitable for use with electronic devices that at least in part operate in accordance with software. The electronic devices, for example, can be computers, personal digital assistants, media players or mobile telephones.

The invention can be implemented in numerous ways, including as a method, system, device, apparatus, or computer readable medium. Several embodiments of the invention are discussed below.

As a method for upgrading software on an electronic device that operates at least partially in accordance with software, one embodiment of the invention includes at least the acts of: sending device information to a host device; receiving an encrypted software module at the electronic device, the encrypted software module being previously encrypted at the host device particularly for use by the electronic device; decrypting the encrypted software module at the electronic device; and thereafter installing the software module on the electronic device.

As a method for upgrading software on a portable electronic device, one embodiment of the invention includes at least the acts of: sending device information to a host device, the device information including device descriptive information, a public cryptographic key and a current version indicator; receiving an encrypted software module at the portable electronic device, the encrypted software module resulting from a software module available to the host device being selected based on the device descriptive information and the current version indicator and then encrypted using the public cryptographic key provided by the portable electronic device; decrypting the encrypted software module at the portable electronic device using a private cryptographic key known by the portable electronic device; authenticating the decrypted software module; and installing the software module on the portable electronic device after the decrypting and the authenticating have successfully completed.

As a computer readable medium including at least computer program code for upgrading software on a computing device, one embodiment of the invention includes at least: computer program code for sending device information to a host device, the device information including device descriptive information, a first cryptographic key and a current version indicator; computer program code for receiving an encrypted software module at the computing device, the encrypted software module resulting from a software module available to the host device being selected based on the device descriptive information and the current version indicator and then encrypted using the first cryptographic key provided by the computing device; computer program code for decrypting the encrypted software module at the computing device using a second cryptographic key known by the computing device; computer program code for authenticating the decrypted software module; and computer program code for installing the software module on the computing device after the decrypting and the authenticating have successfully completed.

As a method for upgrading a software module on a portable electronic device, another embodiment of the invention includes at least the acts of: receiving device information at a network-based server device, the device information pertaining to the portable electronic device and including device descriptive information, a public cryptographic key and a current version indicator for the software module on the portable electronic device; determining whether an updated version of the software module is available from the server device, the determining being based on the device descriptive information pertaining to the portable electronic device; encrypting the updated version of the software module when the determining determines such to be available from the server device, the encrypting using the public cryptographic key provided by the portable electronic device; and transmitting the encrypted software module to the portable electronic device.

As a computer readable medium including at least computer program code for upgrading a software module on a computing device, another embodiment of the invention includes at least: computer program code for receiving device information at a network-based server device, the device information pertaining to the computing device and including device descriptive information, a cryptographic key and a current version indicator for the software module on the computing device; computer program code for determining whether an updated version of the software module is available from the server device, the determining being based on the device descriptive information pertaining to the computing device; computer program code for encrypting the updated version of the software module when the determining determines such to be available from the server device, the encrypting using the cryptographic key provided by the computing device; and computer program code for transmitting the encrypted software module to the computing device.

As a computer readable medium including at least computer program code for upgrading software on an electronic device, one embodiment of the invention includes at least: computer program code for identifying, at a host device, an updated software module for the electronic device; computer program code for encrypting the updated software module for use on the electronic device; computer program code for transmitting the encrypted software module to the electronic device; computer program code for decrypting the encrypted software module at the electronic device; and computer program code for installing the software module on the electronic device.

As a network-based software update system, one embodiment of the invention includes at least: (i) a plurality of mobile client devices, each of the mobile client devices operating in accordance with at least one software module resident on the corresponding mobile client device; (ii) a server device having access to a plurality of software modules, each of the software modules being for use on specific one or more of the mobile client devices; and (iii) at least one client device operatively connectable to the server device and the mobile client devices, the client device operating a media management application for digital media assets. The digital media assets are protected by a digital rights management library having at least one of the software modules. The client device interacts with the server device over a first data link to retrieve an updated software module for the mobile client device to be updated, the updated software module pertaining to the digital rights management library. The client device thereafter interacts with the mobile client device over a second data link to provide the updated software module to the mobile client device to be updated.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION

The invention pertains to improved techniques to update software in electronic devices that are already in use. In one embodiment, software can be updated in a secure and controlled manner using cryptography. The authenticity of the updated software as well as its appropriateness for the particular electronic device can be confirmed prior to update. The software can also be updated on a per module basis. In one embodiment, a server hosts software updates for various electronic devices, and supplies the appropriate software update to the electronic devices via a data network.

Although the invention is generally applicable to updating software of a wide variety of types, the invention is particularly well suited for updating digital rights management software. For security reasons, there can be a need to update DRM software in electronic devices that are in use. The improved techniques of the invention enable DRM software to be updated in a secure and controlled manner. In one implementation, the updating of the DRM software operates to modify a DRM software library provided at the electronic device.

The invention is suitable for use with electronic devices that at least in part operate in accordance with software. The electronic devices, for example, can be computers, personal digital assistants, media players or mobile telephones.

Embodiments of the invention are discussed below with reference to FIGS. 1A-7B. However, those skilled in the art will readily appreciate that the detailed description given herein with respect to these figures is for explanatory purposes as the invention extends beyond these limited embodiments.

Figure 1A:
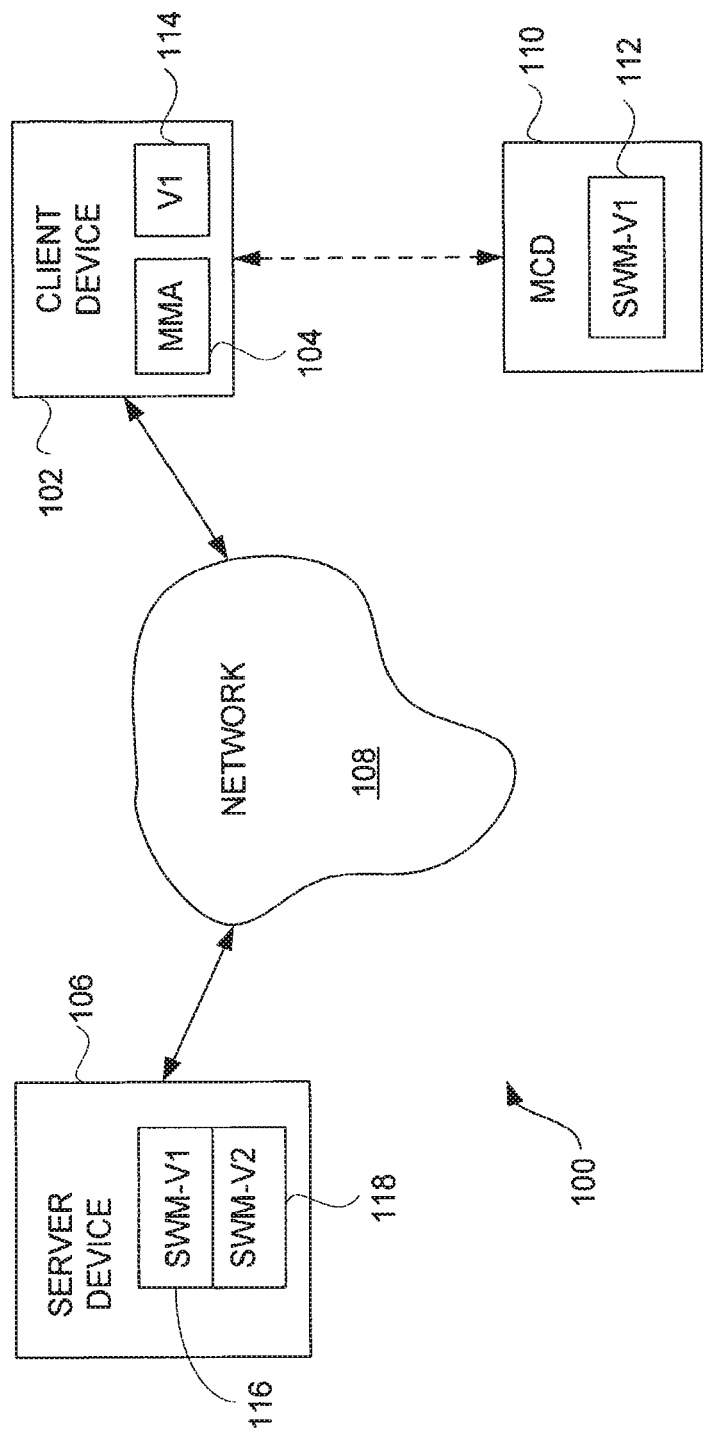
FIG. 1A is a block diagram of a software update system according to one embodiment of the invention.

FIG. 1A is a block diagram of a software update system 100 according to one embodiment of the invention. The software update system 100 includes a client device 102 that includes a media management application (MMA) 104. The client device 102 is, for example, a computer, such as a desktop computer. The media management application 104 is an application program that operates to manage media assets available at the client device 102. The software update system 100 also includes a server device 106 that can couple to the client device 102 via a network 108. The network 108 can be a data network. The network 108 can include at least a portion of a global network, a wide area network or local area network. The network 108 can also be wired and/or wireless.

Still further, the software update system 100 includes a mobile client device (MCD) 110. The MCD 110 can be operatively coupled to the client device 102 by wired or wireless means. In one example, the MCD 110 can couple to the client device 102 over a peripheral bus cable, such as a USB cable. In another example, the MCD 110 can couple to the client device 102 via a wireless link over a wireless network (e.g., Bluetooth, WiFi, WiMax).

According to the invention, the client device 102 can facilitate updating software modules present on the MCD 110. In doing so, the client device 102 communicates with the server device 106. The server device 106 has access to a plurality of software modules that are available for distribution to appropriate mobile client devices. More specifically, the client device 102 interacts with the MCD 110 to identify a software module 112, namely, software module-version 1 (SWM-V1), that is installed on the MCD 110. The client device 102 then stores a version indication 114 associated with the identified software module 112. In the example illustrated in FIG. 1A, the version indication 114 indicates that the installed software module on the MCD 110 is version 1 (V1). The client device 102 can then communicate with the server device 106 via the network 108 to determine whether there is a newer or updated version of the software module for use on the MCD 110. In this example, the server device 106 includes software modules 116 and 118, with the software module 116 being version 1 (SWM-V1) and the software module 118 being version 2 (SWM-V2). In this example, both the software modules 116 and 118 are assumed to be suitable for use on the MCD 110. The server device 106 can then provide the updated software module 118, namely, version 2 (SWM-V2), to the client device 102. Then, the client device 102 can forward the software module-version 2 (SWM-V2) to the MCD 110.

Although the software update system 100 illustrated in FIG. 1A illustrates a single client device and a single MCD, it should be understood that the software update system 100 is typically such that a single server can support updating software modules on a plurality of MCDs via a plurality of client devices. Moreover, although the software update system 100 illustrated in FIG. 1A utilizes one or more client devices, in another embodiment, the software update system need not utilize any client device in performing software updates. In such case, the MCDs can couple to the network 108 and communicate directly to the server device 106.

Figure 1B:
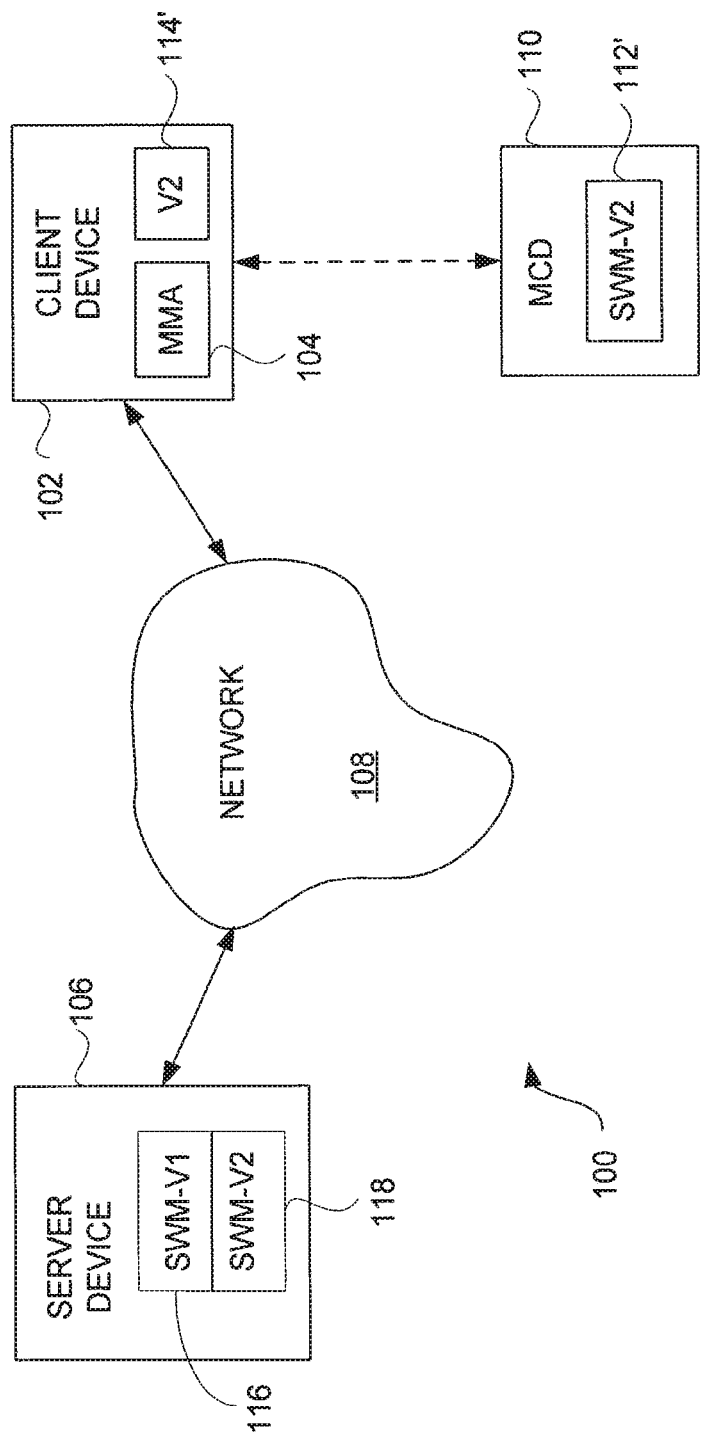
FIG. 1B is a block diagram of the software update system after a software update has occurred.

FIG. 1B is a block diagram of the software update system 100' after a software update has occurred. The software update system 100' represents the software update system 100 after the software module at the MCD 110 has been updated. Note that in FIG. 1B, the MCD 110 includes the software module 112' pertaining to the software module-version 2 (SWM-V2), and the version indicator 114' at the client device 102 indicates that the MCD 110 now utilizes version 2 (SWM-V2).

In one embodiment, the software can pertain to a digital rights management (DRM) software module. The software module can also pertain to a software library. As an example, the software module being updated can be referred to as a DRM library.

One example of a media management application is the iTunes® application, produced by Apple Computer, Inc. of Cupertino, Calif. One example of a server device is the iTunes® Music Store server, also provided by Apple Computer, Inc. of Cupertino, Calif.

Figure 2:
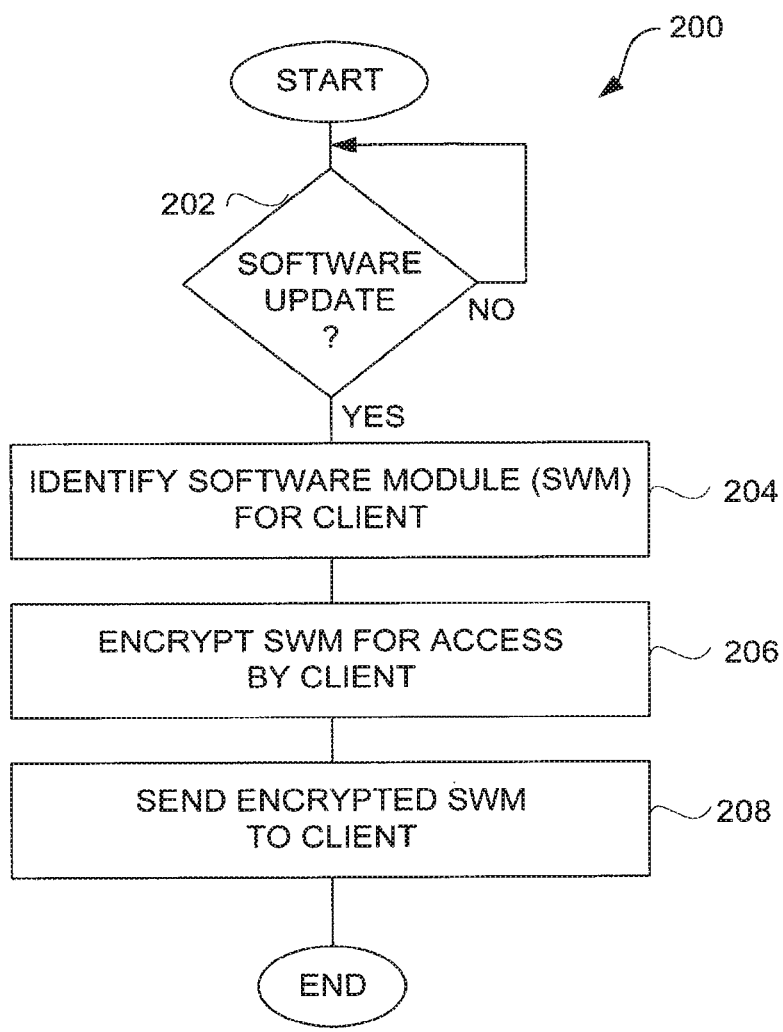
FIG. 2 is a flow diagram of a server software update process according to one embodiment of the invention.

FIG. 2 is a flow diagram of a server software update process 200 according to one embodiment of the invention. The server software update process 200 is, for example, performed by a server. The server pertains to a computing device that couples to a client, or a software program operating thereon. The server can couple to a client directly or via a network. For example, the server can pertain to the client device 102 or the server device 106 illustrated in FIG. 1A.

The server software update process 200 initially begins with a decision 202 that determines whether a software update is to be performed. When the decision 202 determines that a software update is not to be performed, the server software update process 200 awaits until a software update is to be performed. The software update can be automatically performed or performed at the request of a user. In any event, when the decision 202 determines that a software update is required, a software module (SWM) for the client is identified 204. After the software module has been identified 204, the software module is encrypted 206 for access by the client. It should be noted that the software module that was identified 204 is specifically designed for the client, and that the encryption of the software module is to restrict its usage to the client. Thereafter, the encrypted software module is sent 208 to the client. Following the operation 208, the server software update process 200 ends.

Figure 3:
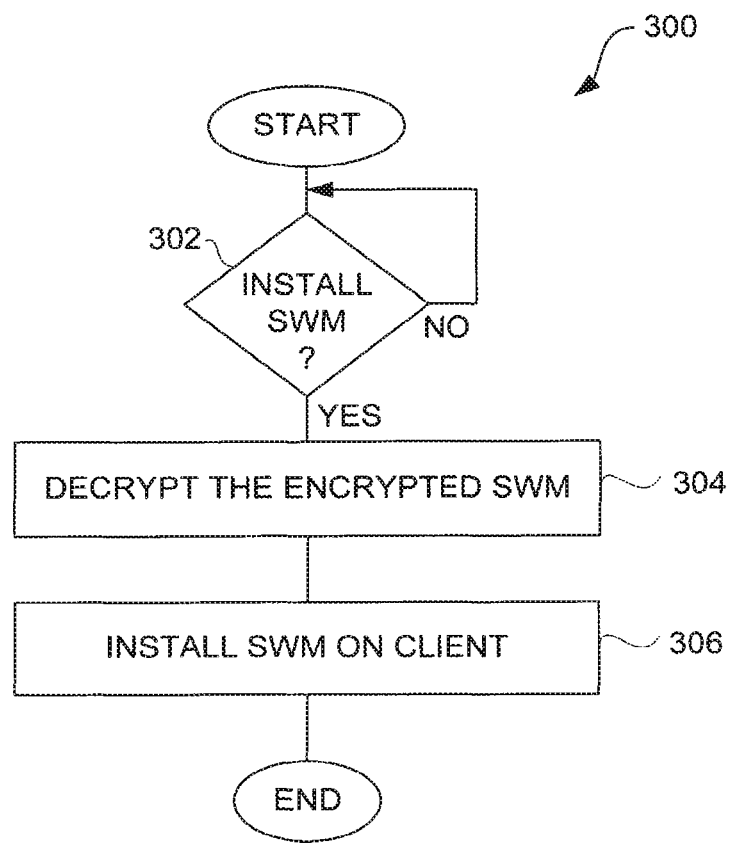
FIG. 3 is a flow diagram of a client software update process according to one embodiment of the invention.

FIG. 3 is a flow diagram of a client software update process 300 according to one embodiment of the invention. The client software update process 300 is, for example, performed by a client operating in accordance with one embodiment of the invention. As an example, the client is typically an electronic device that utilizes software, or a software program operating thereon. For example, the client can pertain to the mobile client device 110 illustrated in FIG. 1A.

The client software update process 300 begins with a decision 302 that determines whether a software module is to be installed at the client. When the decision 302 determines that a software module is not to be installed, then the client software update process 300 awaits the need to install a software module on the client. In other words, the client software update process 300 can be deemed invoked whenever a software module is to be installed on the client. Once the decision 302 determines that a software module is to be installed, the encrypted software module is decrypted 304 at the client. Following the decryption 304, the software module is installed 306 on the client. After the software module has been installed 306 at the client, the client software update process 300 ends.

Figure 4A:
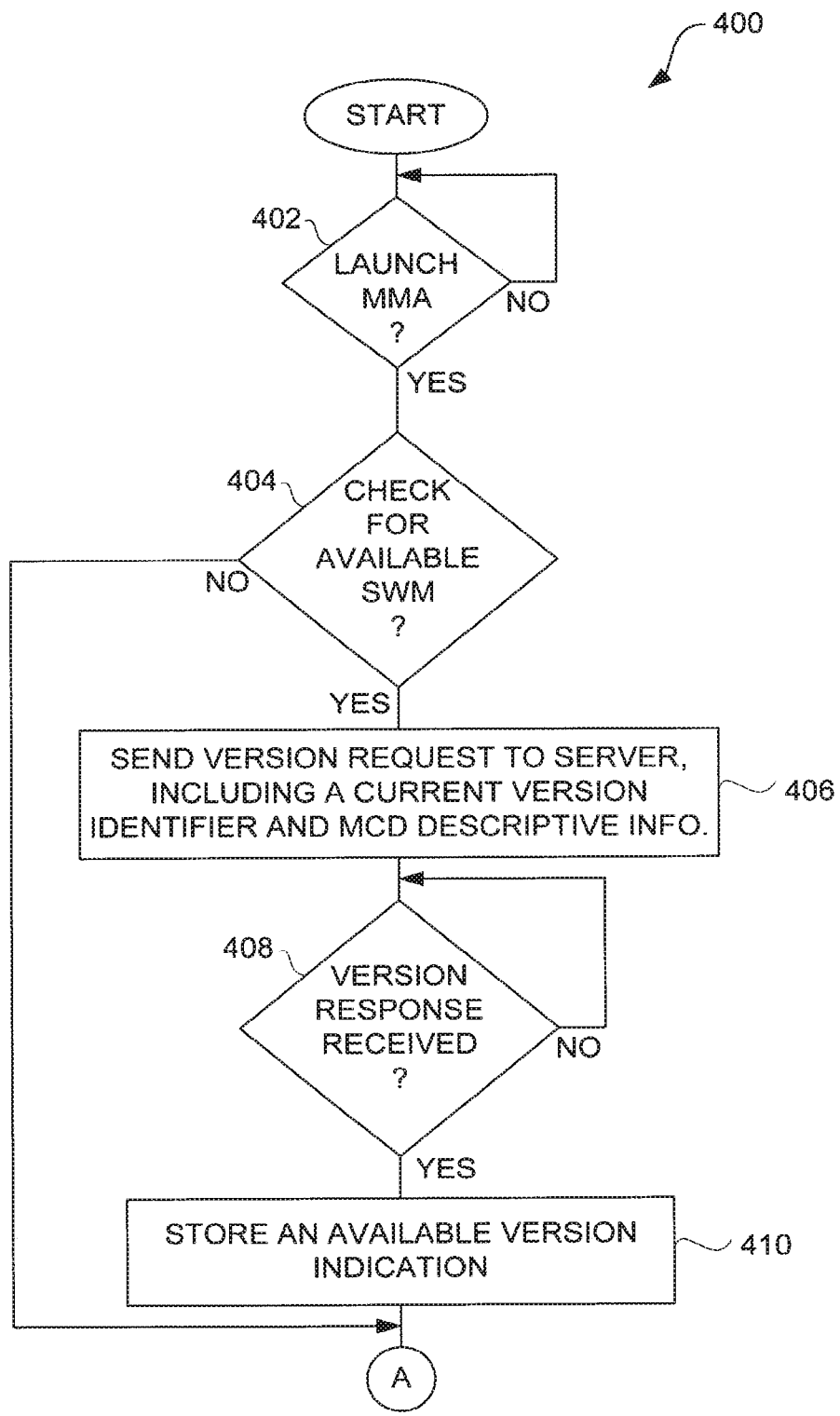
FIGS. 4A and 4B are flow diagrams of a client software update process according to one embodiment of the invention.
Figure 4B:
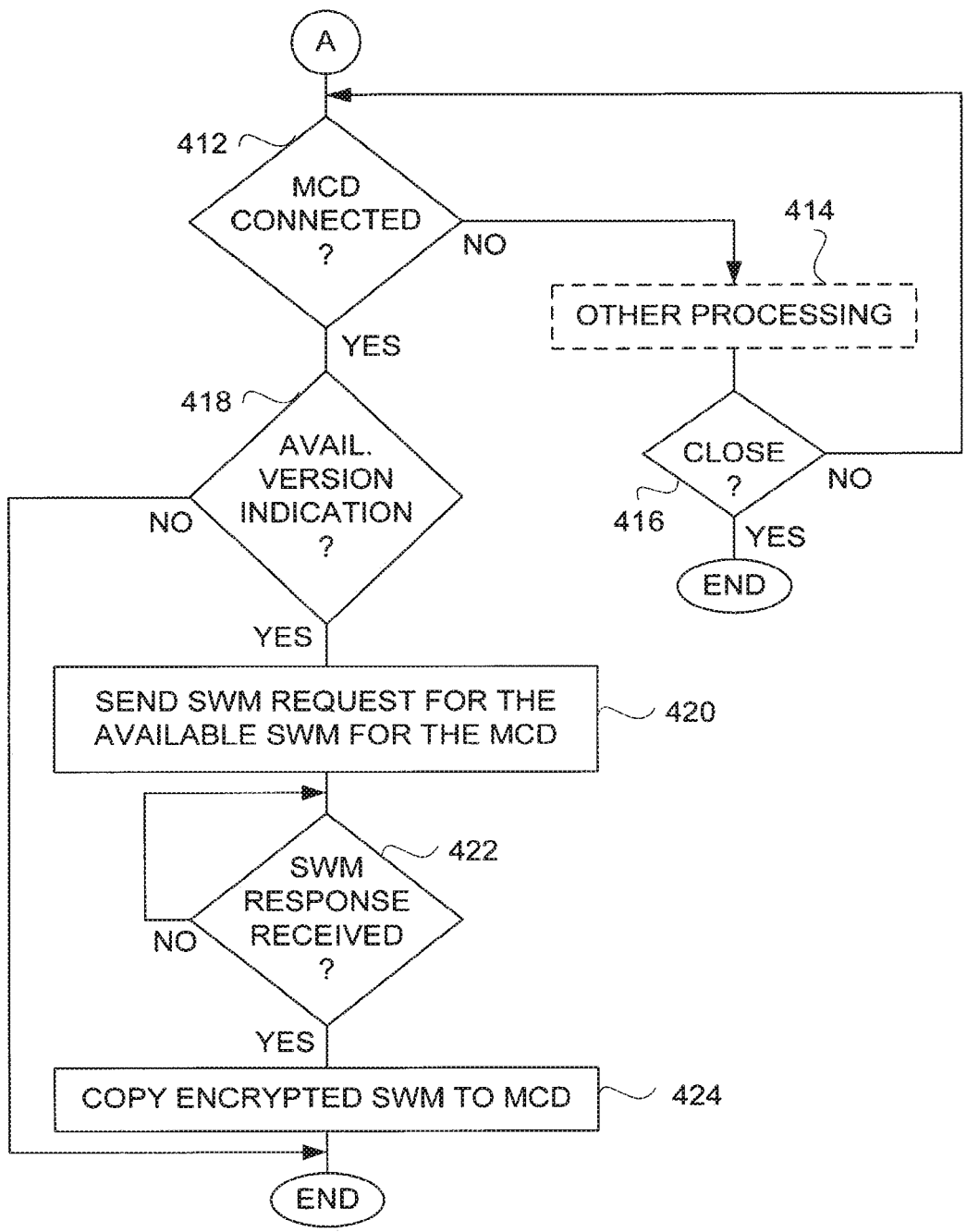

FIGS. 4A and 4B are flow diagrams of a client software update process 400 according to one embodiment of the invention. The client software update process 400 is, for example, performed by a client operating in accordance with one embodiment of the invention. As an example, with reference to FIG. 1A, the client can pertain to the client device 102 or the media management application 104 operating thereon.

The client software update process 400 begins with a decision 402 that determines whether a media management application has been launched. When the decision 402 determines that a media management application has not been launched, then the client software update process 400 awaits such an event. On the other hand, once the decision 402 determines that a media management application has been launched, a decision 404 checks for an available software module. Here, an available software module is typically a newer version of the software module that is suitable for being utilized on the corresponding mobile client device (MCD). The client software update process 400 need not check for available software modules every time it is launched; instead, this can be done periodically (e.g., weekly).

When the decision 404 determines that checking for an available software module is to be performed, a version request is sent 406 to the server. The version request includes at least a current version identifier and MCD descriptive information. The MCD descriptive information is information that describes general characteristics, features or attributes of the MCD.

Next, a decision 408 determines whether a version response has been received from the server. When the decision 408 determines that a version response has not been received, the client software update process 400 can await such a response. However, the waiting period can be limited or processed in a separate non-blocking thread. In any case, once the decision 408 determines that a version response has been received, an available version indication is stored 410 at the client. The version response provides the available version indication to the client. In one embodiment, the available version indication can indicate whether or not an updated software module for the MCD is available from the server.

At this point, the client software update process 400 effectively waits until the MCD connects to the client. While this is not necessary in other embodiments, the connection can allow the MCD to complete the balance of the client software update process 400. While waiting for the disconnection, the MCD can perform other operations unrelated to software update.

More particularly, as illustrated in FIGS. 4A and 4B, following the block 410 or following the decision 404 when no available software module is found, a decision 412 then determines whether the MCD is connected to the client. Typically, the decision 412 would be concerned with whether the MCD has recently been connected to the client. When the decision 412 determines that the MCD is not connected, other processing 414 can optionally be performed by the client. Such other processing 414 would normally be unrelated to upgrading a software module. A decision 416 then determines whether the client software update process 400 should be closed. When the decision 416 determines that the client software update process 400 should be closed, the client software update process 400 ends. Alternatively, when the decision 416 determines that the client software update process 400 should not be closed, the client software update process 400 returns to repeat the decision 412 so as to wait for the MCD to be connected to the client.

Once the decision 412 determines that the MCD is connected to the client, a decision 418 determines whether an available version indication is present. Recall, the available version indication was previously stored 410 at the client based on information provided in a version response from the server. When the decision 418 determines that there is an available version indication, a software module request is sent 420 for the available software module for the MCD. Here, the software module request is sent for 420 to the server and requests that the available software version module be provided to the client. The software module request can include a version identifier for the available software module desired and an encryption key, namely, a public encryption key, to be used to encrypt the available software module. Next, a decision 422 determines whether a software module response has been received from the server. When the decision 422 determines that a software module response has not yet been received, the client software update process 400 can await such a response. Once the decision 422 determines that a software module response has been received, an encrypted software module provided by the software module response can be copied 424 to the MCD. Following the operation 424 or following the decision 418 when it is determined that there is no available version indication, the client software update process 400 is complete and ends.

Figure 5A:
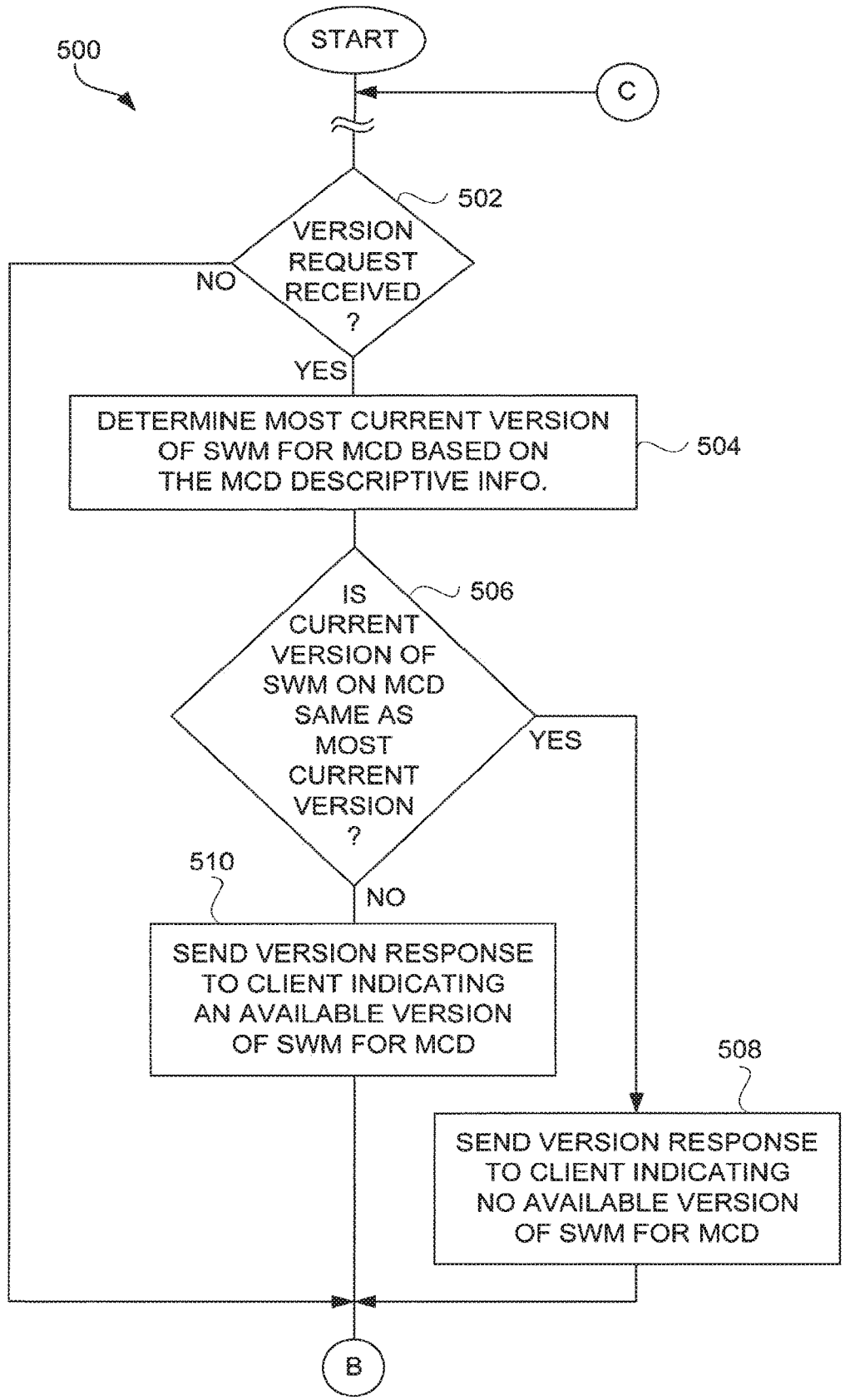
FIGS. 5A and 5B are flow diagrams of a server software update process according to one embodiment of the invention.
Figure 5B:
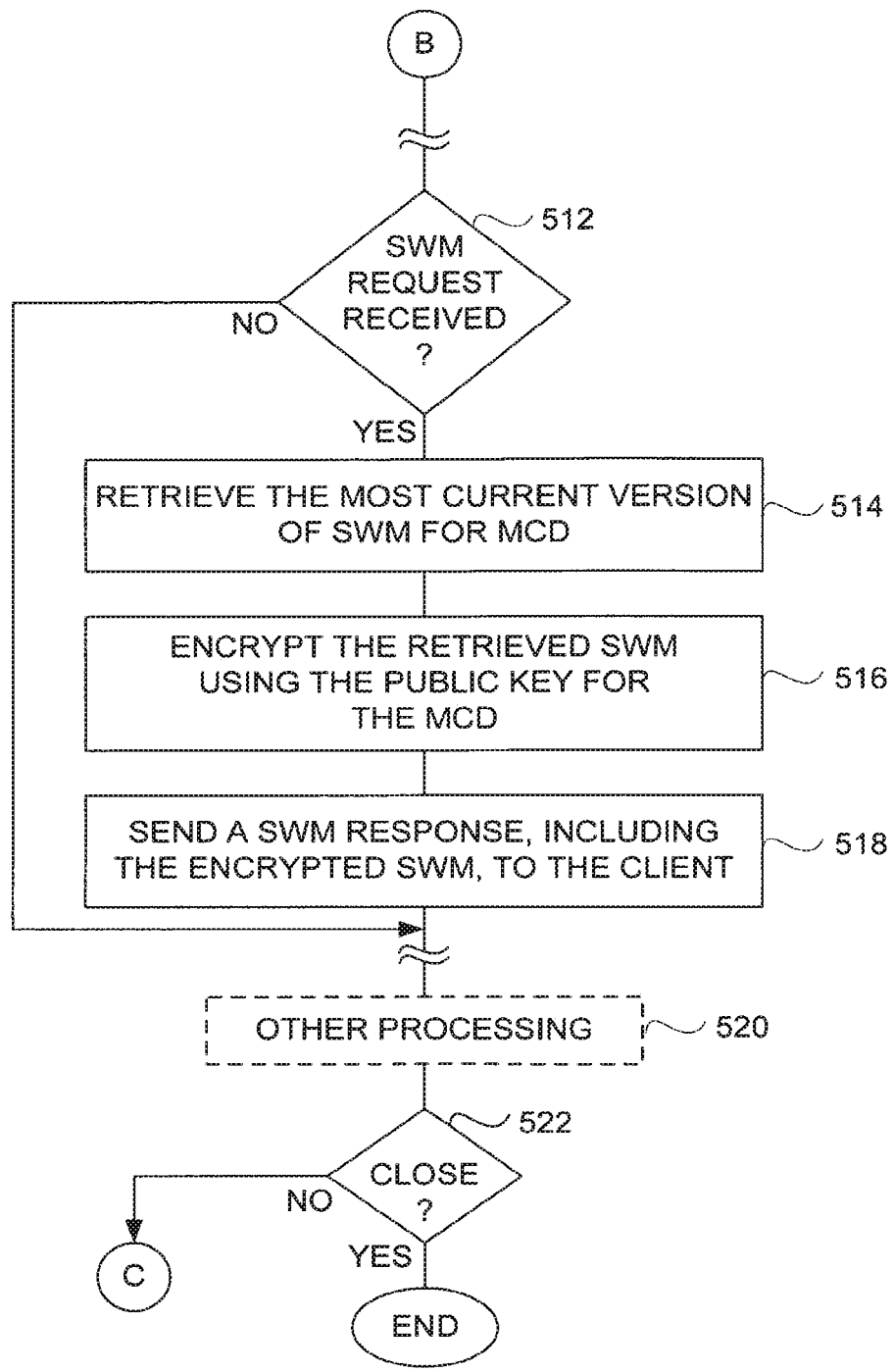

FIGS. 5A and 5B are flow diagrams of a server software update process 500 according to one embodiment of the invention. The server software update process 500 is, for example, performed by a server operating in accordance with one embodiment of the invention. As an example, with reference to FIG. 1A, the server can pertain to the server device 106 or a software application operating thereon.

Typically, the server is capable of performing a plurality of different processes. The server software update process 500 is considered one such process that can be performed by the server. Accordingly, the processing discussed in FIGS. 5A and 5B is processing directed at a software update for a client device (e.g., mobile client device) and such processing may be intertwined with other processing performed at the server.

The server software update process 500 begins with a decision 502 that determines whether a version request has been received. When the decision 502 determines that a version request has been received, a most current version of the software module for the MCD is determined 504 based on the MCD descriptive information. Here, the version request that has been received from the client includes an indication of the current version of the software module on the MCD as well as MCD descriptive information. The MCD descriptive information is information that describes general characteristics, features or attributes of the MCD.

Next, a decision 506 determines whether the current version of the software module on the MCD is the same as the most current version available from the server. When the decision 506 determines that the current version of the software module on the MCD is the same as the most current version available at the server, a version response is sent 508 to the client indicating that there is no available version of the software module for the MCD. In other words, in this condition, there is no need to update the software module on the MCD. On the other hand, when the decision 506 determines that the current version of the software module on the MCD is not the same as the most current version available at the server, a version response is sent 510 to the client indicating that there is an available version of the software module for the MCD.

Following the blocks 508 and 510, as well as following the decision 502 when a version request has not been received, additional processing can be performed by the server software update process 500 when a software module request has been received. In particular, when a decision 512 determines that a software module request has been received, the most current version of the software module for the MCD is retrieved 514. Here, the most current version of the software module for the MCD is retrieved 514 from the server. In other words, the server centrally makes various versions of software modules for various MCDs available.

Next, the retrieved software module is encrypted 516 using a public-key for the MCD. Here, the software module request provides a public-key to be used in encrypting (directly or indirectly) the retrieved software module. The public-key is part of a key pair that is specifically associated with the MCD. In one embodiment, the key pair is stored on the MCD. After the retrieved software module is encrypted 516, a software module response is sent 518 to the client. The software module response includes at least the encrypted software module for the MCD.

Thereafter, other processing 520 may be optionally performed at the server. At some point thereafter, a decision 522 determines whether the server software update process 500 should close. When the decision 522 determines that the server software update process 500 should not close, then the server software update process 500 returns to the beginning of the server software update process 500. Alternatively, when the decision 522 determines that the server software update process 500 should close, then the server software update process 500 ends.

In general, client or the server can be considered a host device. In FIGS. 4A and 5A, the client interacts with the server to determine whether an updated version of the SWM is present. In this embodiment, the server determines whether an updated version of the SWM is present, and if so informs the client of the updated version. Thereafter, at the appropriate time, the client would retrieve the updated version of the SWM for the MCD.

However, in another embodiment, the client can determine whether an updated version of the SWM is present. This embodiment would represent an embodiment that differs from the embodiment of FIGS. 4A and 4B. In such an embodiment, the client can periodically query the server for a table (or list) of most current versions for a plurality of different devices. The client then stores the table (which can include version numbers representing the most current versions for the different devices). Thereafter, when the MCD is connected to the client, the client obtains the MCD descriptive information (including current version on the MCD) and compares such with the most current version available for that device as indicated in the stored table. If there is an available software version, the client requests the appropriate software update (e.g., using a version number) from the server. Once the appropriate software update is received, the available software module can be supplied to the MCD.

Figure 6:
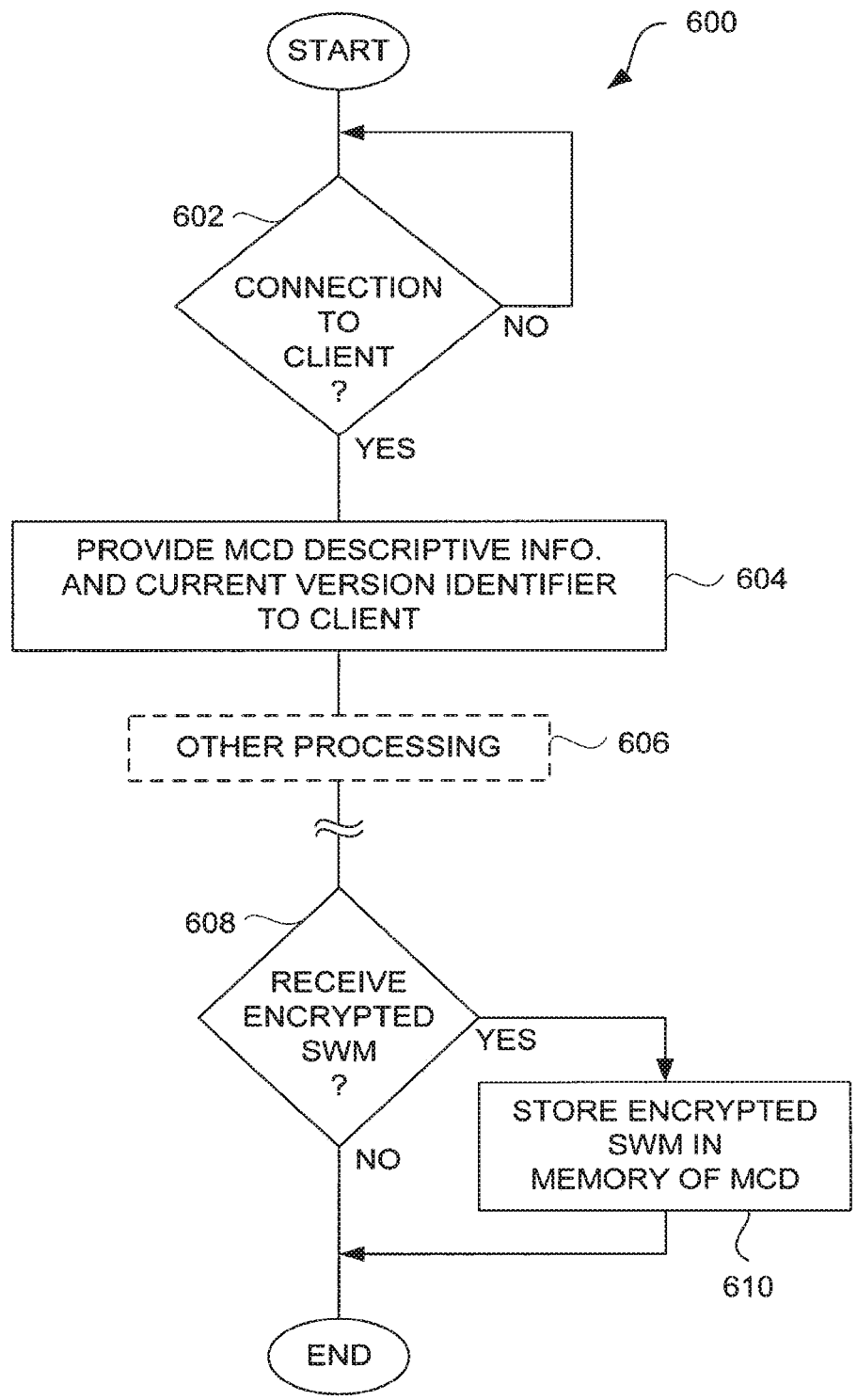
FIG. 6 is a flow diagram of a mobile client connection process according to one embodiment of the invention.

FIG. 6 is a flow diagram of a mobile client connection process 600 according to one embodiment of the invention. The mobile client connection process 600 is, for example, performed by a portable client operating in accordance with one embodiment of the invention. For example, the portable client can be a mobile client device (MCD). As an example, with reference to FIG. 1A, the MCD can pertain to the mobile client device 110 or a software application operating thereon.

The mobile client connection process 600 begins with a decision 602 that determines whether the MCD is connected to the client. When the decision 602 determines that the MCD is not connected to the client, either by wired or wireless means, the mobile client connection process 600 awaits such a connection. In other words, the mobile client connection process 600 can be deemed invoked once a connection is established between the MCD and the client. In any event, once the decision 602 determines that a connection exists between the MCD and the client, MCD descriptive information and a current version identifier are provided 604 to the client. Here, the MCD descriptive information as well as the current version identifier are maintained by the MCD. Then, other processing 606 can be performed at the MCD. Such other processing 606 would typically not be part of the mobile client connection processing 600, but is illustrated in FIG. 6 for context. As an example, one type of other processing 606 that could be performed is a synchronization operation between the MCD and the client, e.g., to synchronize music libraries, calendars, etc. Additional details on synchronization of digital assets or data can be found in U.S. patent application Ser. No. 10/277,418, filed Oct. 21, 2002, and entitled "INTELLIGENT INTERACTION BETWEEN MEDIA PLAYER AND HOST COMPUTER", which is hereby incorporated herein by reference.

At some point while the MCD is connected to the client, a software update will be performed. The software update is performed in a secure manner. Hence, according to the mobile client connection process 600, the MCD will receive an encrypted software module from the client. The mobile client connection processing 600 includes a decision 608 that determines whether an encrypted software module has been received. When the decision 608 determines that an encrypted software module has been received at the MCD, the encrypted software module is stored 610 in memory of the MCD. The memory can be of many different types, including Flash memory storage, disk drive storage, etc. Following the block 610 or following the decision 608 when an encrypted software module is not received, the mobile client connection process 600 ends.

Figure 7A:
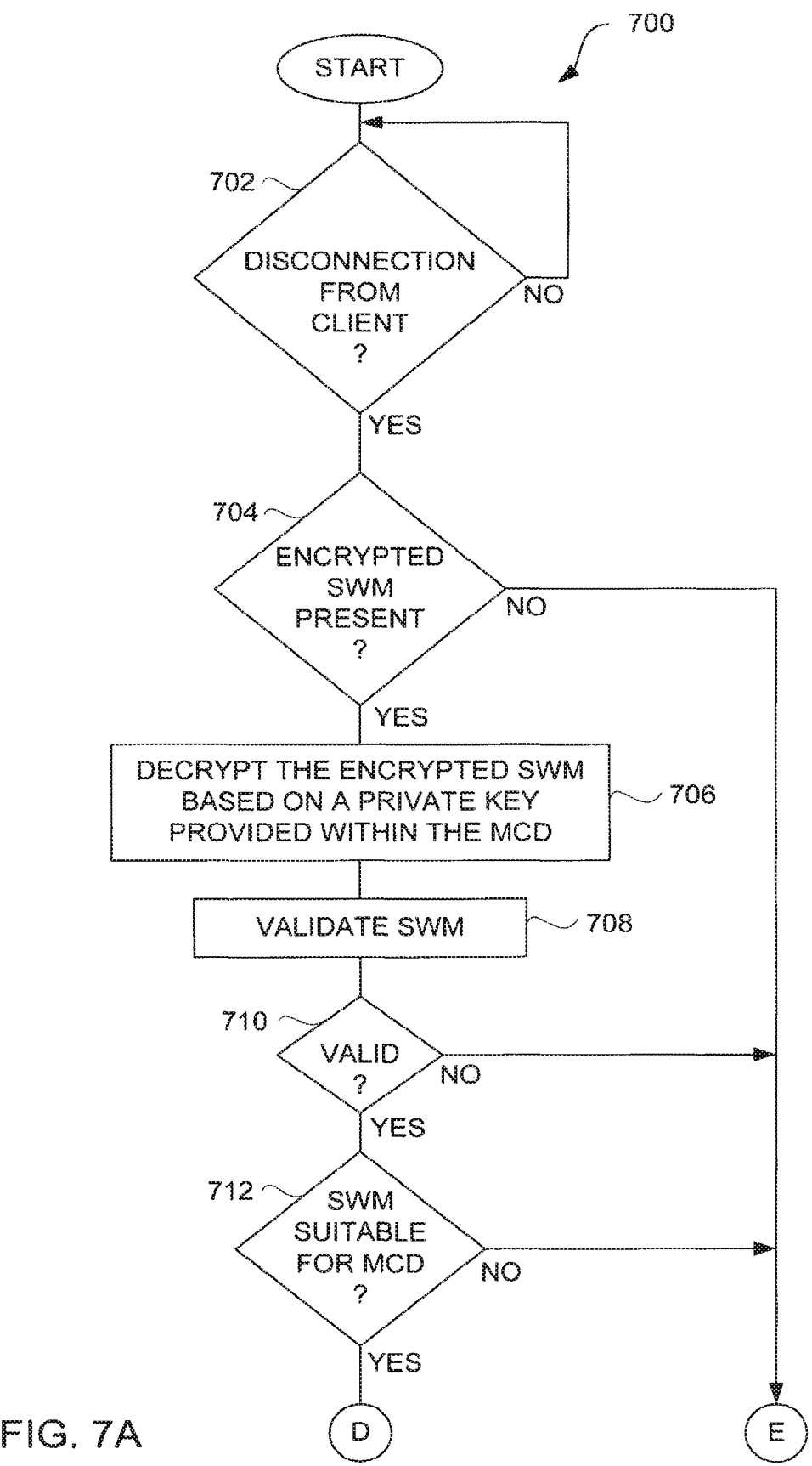
FIGS. 7A and 7B are flow diagrams of a mobile client disconnection process according to one embodiment of the invention.
Figure 7B:
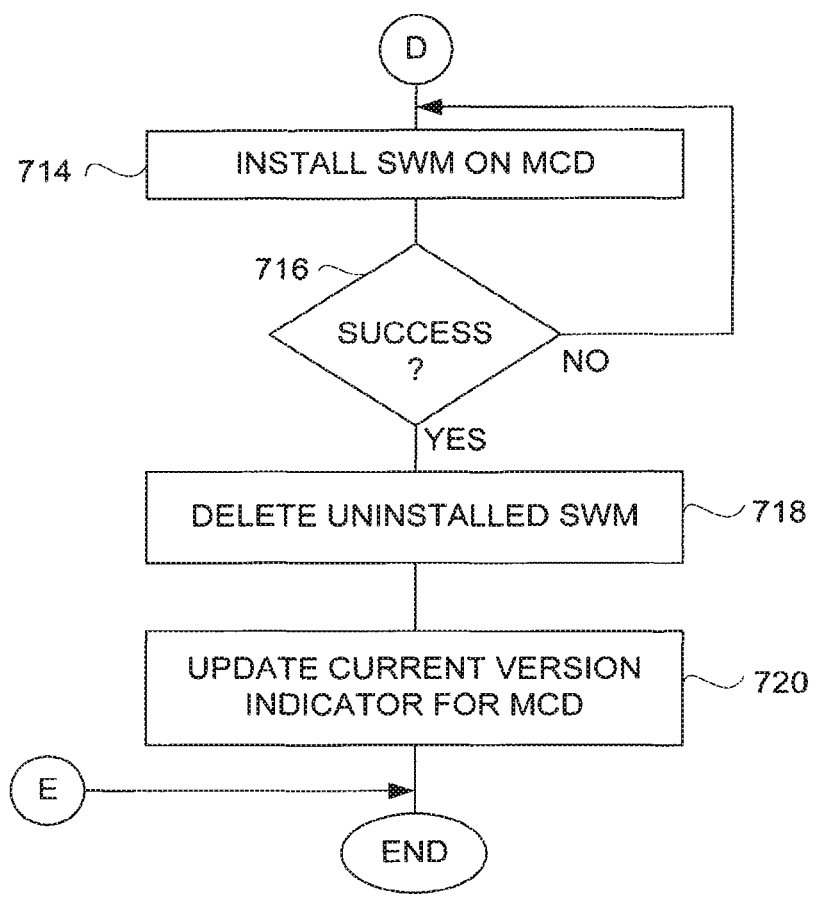

FIGS. 7A and 7B are flow diagrams of a mobile client disconnection process 700 according to one embodiment of the invention. The mobile client disconnection process 700 is, for example, performed by a portable client operating in accordance with one embodiment of the invention. For example, the portable client can be a mobile client device (MCD). As an example, with reference to FIG. 1A, the MCD can pertain to the mobile client device 110 or a software application operating thereon.

The mobile client disconnection process 700 begins with a decision 702 that determines whether the MCD has been disconnected from the client. When the decision 702 determines that the MCD has not been disconnected from the client, then the mobile client disconnection process 700 awaits such disconnection. In other words, the mobile client disconnection process 700 is initiated once the MCD is disconnected from the client. Hence, when the decision 702 determines that the MCD has been disconnected from the client, a decision 704 determines whether an encrypted software module is present on the MCD. Here, as noted in block 610 of FIG. 6, the mobile client connection process 600 operates to store the appropriate encrypted software module on the MCD. Here, at the decision 704, a determination is made as to whether an encrypted software module has been stored on the MCD.

When the decision 704 determines that an encrypted software module has been stored on the MCD, the encrypted software module is decrypted 706 using a private key provided within the MCD. Here, the MCD, as previously noted, includes a pair of cryptographic keys. These cryptographic keys include the public key noted above as well as a private key. The decryption of the encrypted software module is performed using the required private key. Hence, the encrypted software module is only able to be properly decrypted if the software module was encrypted for use on the MCD. In other words, the encryption of the software module was performed using the public key that is the counterpart of the private key stored in the MCD.

Assuming that the decryption 706 is successful, the software module can be validated 708. In one embodiment, the software module can be validated 708 using a digital signature. By verification of the digital signature, the validity of the software module is established. For example, the manufacturer of the MCD can ensure that the software module is authentic (i.e., approved by the manufacturer) before being permitted to be utilized thereon. A decision 710 then determines whether the software module is valid. Here, to be valid, the software module must not only be properly decrypted but also successfully authenticated.

When the decision 710 determines that the software module is valid, a decision 712 determines whether the software module is suitable for the MCD. Here, the software module can be determined to be suitable for the MCD when the software module is affiliated with the MCD. The software module can be properly affiliated when the software module is suitable for use with the MCD. For example, the decision 712 can determine whether the software module is suitable for use on the model and/or hardware platform of the MCD. As a particular example, the software module can include one or more identifiers for the model and/or platform of the MCD, and these identifiers can be compared with like identifiers stored in the MCD.

When the decision 712 determines that the software module is suitable for the MCD, the software module can be installed 714 on the MCD. Next, a decision 716 determines whether the installation of the software module has been successful. When the decision 716 determines that the installation has not been successful, the installation 714 can be repeated. However, if the installation of the software module repeatedly fails, the mobile client disconnection process 700 can end without having installed the software module. On the other hand, when the decision 716 determines that the software module has been successfully installed on the MCD, the uninstalled software module can be deleted 718. Here, the uninstalled software module was stored in the memory of the MCD (e.g., block 610 of FIG. 6); hence, the deletion 718 of the uninstalled software module is performed for security reasons as well as to free-up memory of the MCD. In addition, a current version indicator is updated 720 for the MCD. The updating 720 of the current version indicator is appropriate because the software module on the MCD has been updated and is thus now the current version of the software module. The stored current version indicator also facilitates providing of current version information to the client as noted above (e.g., block 604 of FIG. 6). Following the block 720, as well as following any of the decisions 704, 710 and 712 when the evaluated conditions are not present, the mobile client disconnection process 700 is complete and ends.

With regards to authentication, the authentication of the software module (as discussed above), such as by a digital signature, can be utilized by a vendor. As an example, the updated software module can be achieved for a first vendor, but a second vendor can require that the software module be approved by them before being installed or otherwise provided to the electronic device. For example, if the first vendor is a software provider and the second vendor is a hardware platform provider, the first vendor can provide the updated software module to the electronic device in a secure manner, but the second vendor can require that the software module be authenticated or validated before being installed on the electronic device. Additionally, the second vendor might also provide their own level of encryption apart of any encryption provided by the first vendor. Hence, in one implementation, the software module of the first vendor can be packaged with a digital signature and/or encryption of the second vender before being made available to clients.

As noted above, a cryptographic key can be used to secure and control the software update process. For additional security or performance reasons, a combination of cryptographic keys can be used. As a result, to the extent that a public key is used, the public key need not be used to directly encrypt the software module. In one embodiment, the encryption process operates as follows. First, a random cryptographic key (random key) is generated. As an example, the random key can be a 128-bit AES key, which is a random symmetric key. The software module is first encrypted using the random key. This results in an encrypted software module. In addition, the random key is encrypted using the public key provided by the electronic device. This results in an encrypted cryptographic key. In one example, the encrypted cryptographic key is a 1024-bit RSA key. In this embodiment, the electronic device (e.g., MCD) receives the encrypted software module in a first electronic file, and receives the encrypted cryptographic key in a second electronic file. Thereafter, to install the software module on the electronic device, the encrypted cryptographic key in second electronic file is decrypted using a private key resident in the electronic device. The resulting cryptographic key is the random key which can then be used to decrypt the encrypted software module in the first electronic file. The software module is then in the "clear" (i.e., unencrypted) and can be installed on the electronic device.

The software module update according to the invention can be provided in automatic fashion. Namely, as the client operatively connects to a server, the server can provide the client with any updated software modules without the participation of the user of the client. Alternatively, in another embodiment, the user could be prompted at the client (e.g., portable electronic device) for permission to install an updated software module.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that software updates can be performed over a network in a secure manner. The secure nature of the software updates prevents reverse-engineering of the software. For example, the security imposed secures against unauthorized interception and inspection of the software while being transmitted to an electronic device. Another advantage of the invention is that software used by an electronic device can be updated on a per-module basis, which is particularly useful when the electronic device uses software or hardware from different vendors. Still another advantage of the invention is that software updates can be performed in an automated manner, and thus need not burden users of electronic devices with software updates.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for updating software modules installed on client devices, the method comprising, at a client device:
   transmitting, to a first server device, a current version identifier for a software module installed on the client device;
   receiving an encrypted updated software module from a second server device that is communicatively coupled to and distinct from the first server device, wherein:
   the client device and the first server device communicate over a first data link,
   the client device and the second server device communicate over a second data link that is distinct from the first data link, and
   the encrypted updated software module is encrypted using a public encryption key that is unique to the client device;
   decrypting the encrypted updated software module using a private encryption key to produce a decrypted updated software module, wherein the private encryption key is a counterpart to the public encryption key; and
   installing the decrypted updated software module.

2. The method of claim 1, wherein, when the first server device determines, based on the current version identifier for the software module, that an updated software module is available, the first server device issues a request to the second server device to provide the updated software module to the client device.

3. The method of claim 1, wherein the first server device manages a plurality of current version identifiers for respective current versions of software modules installed on a plurality of client devices.

4. The method of claim 3, wherein the plurality of current version identifiers includes the current version identifier, and the plurality of client devices includes the client device.

5. The method of claim 1, wherein:
   the first server device and the second server device communicate over a third data link, and
   the first, second, and third data links are distinct from one another.

6. The method of claim 1, further comprising:
   providing, to the first server device, the public encryption key, wherein the first server device provides the public encryption key to the second server device.

7. The method of claim 1, further comprising, prior to installing the decrypted updated software module:
   authenticating a digital signature associated with the decrypted updated software module.

8. At least one non-transitory computer readable storage medium configured to store instructions that, when executed by at least one processor included in a client device, cause the client device to carry out steps that include:
   transmitting, to a first server device, a current version identifier for a software module installed on the client device;
   receiving an encrypted updated software module from a second server device that is communicatively coupled to and distinct from the first server device, wherein:
   the client device and the first server device communicate over a first data link,
   the client device and the second server device communicate over a second data link that is distinct from the first data link, and
   the encrypted updated software module is encrypted using a public encryption key that is unique to the client device;
   decrypting the encrypted updated software module using a private encryption key to produce a decrypted updated software module, wherein the private encryption key is a counterpart to the public encryption key; and
   installing the decrypted updated software module.

9. The at least one non-transitory computer readable storage medium of claim 8, wherein, when the first server device determines, based on the current version identifier for the software module, that an updated software module is available, the first server device issues a request to the second server device to provide the updated software module to the client device.

10. The at least one non-transitory computer readable storage medium of claim 8, wherein the first server device manages a plurality of current version identifiers for respective current versions of software modules installed on a plurality of client devices.

11. The at least one non-transitory computer readable storage medium of claim 10, wherein the plurality of current version identifiers includes the current version identifier, and the plurality of client devices includes the client device.

12. The at least one non-transitory computer readable storage medium of claim 8, wherein:
   the first server device and the second server device communicate over a third data link, and the first, second, and third data links are distinct from one another.

13. The at least one non-transitory computer readable storage medium of claim 8, wherein the steps further include:
providing, to the first server device, the public encryption key, wherein the first server device provides the public encryption key to the second server device.

14. The at least one non-transitory computer readable storage medium of claim 8, wherein the steps further include, prior to installing the decrypted updated software module:
authenticating a digital signature associated with the decrypted updated software module.

15. A client device, comprising:
at least one processor; and
at least one memory storing instructions that, when executed by the at least one processor, cause the client device to perform steps that include:
transmitting, to a first server device, a current version identifier for a software module installed on the client device;
receiving an encrypted updated software module from a second server device that is communicatively coupled to and distinct from the first server device, wherein:
the client device and the first server device communicate over a first data link,
the client device and the second server device communicate over a second data link that is distinct from the first data link, and
the encrypted updated software module is encrypted using a public encryption key that is unique to the client device;
decrypting the encrypted updated software module using a private encryption key to produce a decrypted updated software module, wherein the private encryption key is a counterpart to the public encryption key; and
installing the decrypted updated software module.

16. The client device of claim 15, wherein, when the first server device determines, based on the current version identifier for the software module, that an updated software module is available, the first server device issues a request to the second server device to provide the updated software module to the client device.

17. The client device of claim 15, wherein the first server device manages a plurality of current version identifiers for respective current versions of software modules installed on a plurality of client devices.

18. The client device of claim 17, wherein the plurality of current version identifiers includes the current version identifier, and the plurality of client devices includes the client device.

19. The client device of claim 15, wherein:
the first server device and the second server device communicate over a third data link, and
the first, second, and third data links are distinct from one another.

20. The client device of claim 15, wherein the at least one processor further causes the client device to perform steps that include:
providing, to the first server device, the public encryption key, wherein the first server device provides the public encryption key to the second server device.

\* \* \* \* \*